US007760300B2

United States Patent
Ham et al.

(10) Patent No.: US 7,760,300 B2
(45) Date of Patent: Jul. 20, 2010

(54) SAMPLE FOR MEASURING ALIGNMENT AXIS FOR LIQUID CRYSTAL DISPLAY, METHOD OF MANUFACTURING SAMPLE, AND METHOD OF MEASURING ALIGNMENT AXIS

(75) Inventors: Yong Sung Ham, Seoul (KR); Ha Young Lee, Seoul (KR); Byung Geol Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 274 days.

(21) Appl. No.: 11/819,753

(22) Filed: Jun. 28, 2007

(65) Prior Publication Data

US 2008/0074598 A1 Mar. 27, 2008

(30) Foreign Application Priority Data

Jun. 30, 2006 (KR) .................. 10-2006-0060989

(51) Int. Cl.
*G02F 1/1337* (2006.01)
(52) U.S. Cl. .............. 349/123; 349/127; 349/128; 349/129; 349/130; 349/132
(58) Field of Classification Search .......... 349/123–136
See application file for complete search history.

(56) References Cited

U.S. PATENT DOCUMENTS

| 5,635,722 | A | * | 6/1997 | Wakamoto et al. ......... 250/548 |
| 6,157,427 | A | * | 12/2000 | Saynor et al. .............. 349/123 |
| 6,512,569 | B1 | * | 1/2003 | Acosta et al. ............. 349/181 |
| 6,593,986 | B2 | * | 7/2003 | Kwon et al. ............... 349/124 |
| 7,471,380 | B2 | * | 12/2008 | Kishioka .................... 356/138 |
| 7,531,223 | B2 | * | 5/2009 | Tazaki et al. ............... 428/1.2 |
| 2003/0190437 | A1 | * | 10/2003 | Verrall et al. .............. 428/1.3 |
| 2005/0140882 | A1 | | 6/2005 | Park |
| 2006/0132690 | A1 | | 6/2006 | Choi |
| 2008/0160222 | A1 | * | 7/2008 | Harding et al. ........... 428/1.26 |

FOREIGN PATENT DOCUMENTS

CN 1637504 A 7/2005

* cited by examiner

*Primary Examiner*—Hoan C Nguyen
(74) *Attorney, Agent, or Firm*—McKenna Long & Aldridge LLP

(57) ABSTRACT

A sample for measuring an alignment axis for a liquid crystal display, a method of manufacturing the sample, and a method of measuring an alignment axis are disclosed. The sample includes a first substrate, a first alignment layer positioned on the first substrate, and a second alignment layer. The second alignment layer is positioned on the first alignment layer, and has an anisotropy more than an anisotropy of the first alignment layer.

7 Claims, 6 Drawing Sheets

SAMPLE FOR MEASURING ALIGNMENT AXIS FOR LIQUID CRYSTAL DISPLAY, METHOD OF MANUFACTURING SAMPLE, AND METHOD OF MEASURING ALIGNMENT AXIS

This application claims the benefit of Korean Patent Application No. 10-2006-0060989 in Korea filed on Jun. 30, 2006, which is hereby incorporated by reference for all purposes as if fully set forth herein.

BACKGROUND

1. Field of the Invention

This document relates to a display apparatus, and more particularly, to a sample for measuring an alignment axis for a liquid crystal display, a method of manufacturing the sample, and a method of measuring an alignment axis.

2. Description of the Related Art

Liquid crystal displays are generally devices displaying an image using optical anisotropy and birefringence properties of a liquid crystal.

In the liquid crystal displays, two substrates each having electrodes for generating electric field face each other so that the surfaces of the two substrates on which the electrodes are formed are opposite to each other, and a liquid crystal material is injected between the two substrates.

Alignment directions of the liquid crystal molecules are changed by electric field obtained by applying a voltage to the electrodes, and thereby the liquid crystal displays display an image by controlling the quantity of light transmitted through a transparent insulating substrates.

In the liquid crystal displays, a thin film transistor-liquid crystal display (TFT-LCD) using a TFT as a switching device has been generally used.

In the TFT-LCD, white light generated in a backlight unit passes through liquid crystal pixels such that transmittance of the white light is controlled. Then, the color screen is displayed using additive color mixtures of light transmitted through red (R), green (G) and blue (B) color filter layers positioned on the liquid crystal pixels.

Specifically, a driving principle of the liquid crystal display employs the optical anisotropy and the birefringence properties of the liquid crystal. Further, because the liquid crystal molecules have a thin and long molecule structure, the liquid crystal molecules have directionality and polarity in the molecules alignment and the alignment direction of the liquid crystal molecules may be controlled by artificially applying electric field to the liquid crystal molecules.

Accordingly, if the alignment direction of the liquid crystal molecules is optionally controlled, light may be transmitted or blocked depending on the alignment direction of the liquid crystal molecules due to the optical anisotropy of the liquid crystal. This results in the display of color and image due to changes in transmittance of light.

Since an initial alignment state of the liquid crystal molecules is determined by an alignment direction of the alignment layer, the alignment direction of the alignment layer and the polarized direction need to be known accurately.

However, since an anisotropic layer of the alignment layer is formed on only the surface of the alignment layer in the related art, it difficult to accurately measure the alignment direction.

SUMMARY

In one aspect, a sample for measuring an alignment axis for a liquid crystal display includes a first substrate, a first alignment layer positioned on the first substrate, and a second alignment layer that is positioned on the first alignment layer and has anisotropy more than anisotropy of the first alignment layer.

The second alignment layer may be formed of a material having anisotropy more than anisotropy of the first alignment layer.

An alignment direction of the second alignment layer may be substantially the same as an alignment direction of the first alignment layer.

The second alignment layer may be formed of reactive mesogen (RM).

A thickness of the first alignment layer may be less than a thickness of the second alignment layer.

A thickness of an isotropic layer of the first alignment layer may be more than a thickness of an anisotropic layer of the first alignment layer.

An anisotropic area of the second alignment layer may have a thickness of about several thousands Å.

The first substrate may be a thin film transistor array substrate or a color filter substrate.

In another aspect, a method of manufacturing a measuring sample of an alignment axis for a liquid crystal display includes forming a first substrate, forming a first alignment layer on the first substrate, coating a material having anisotropy more than anisotropy of the first alignment layer on the first alignment layer to form a second alignment layer.

The method may further include performing a pre-bake process on the second alignment layer, and performing a UV curing process on the second alignment layer.

The second alignment layer may be formed of a material having anisotropy more than anisotropy of the first alignment layer through a thermosetting process or a photocuring process.

An alignment direction of the second alignment layer may be substantially the same as an alignment direction of the first alignment layer.

The second alignment layer may be formed of reactive mesogen (RM).

The first alignment layer may be formed on the first substrate through a rubbing process, and the second alignment layer may be formed by coating the reactive mesogen (RM) on the first alignment layer.

The first alignment layer may be formed on the first substrate using any one of an optical alignment method, an ion beam alignment method, an inorganic-film oblique evaporation method, a micro-rubbing method, and a self-absorption alignment method.

The second alignment layer may be formed using any one of a spin coating method, a roll coating method, a slit coating method, and an inkjet coating method.

In still another aspect, a method of measuring an alignment axis for a liquid crystal display includes preparing a liquid crystal panel including a first alignment layer and a second alignment layer as a measuring sample, the first alignment layer being formed on a first substrate, and the second alignment layer being formed on the first alignment layer and having anisotropy more than anisotropy of the first alignment layer, putting the measuring sample into a measuring sample holder, and aligning the measuring sample along a reference axis, arranging first and second polarizers in front and in rear of the measuring sample in a cross-Nicol configuration, respectively, measuring light passing through the first polarizer, the measuring sample, and the second polarizer using a detector, rotating the measuring sample holder, into which the measuring sample is put, in the azimuth direction to measure changes in the intensity of transmissive light depending on rotation angles in the azimuth direction, and detecting an angle at which the intensity of transmissive light is minimized to determine the detected angle as an alignment direction of the measuring sample.

A thickness of an anisotropic layer of the alignment layer of the measuring sample may be more than a thickness of an isotropic layer of the alignment layer of the measuring sample, and an angle at which the intensity of transmissive light may be minimized is determined as the alignment direction of the measuring sample.

An alignment direction of the second alignment layer may be substantially the same as an alignment direction of the first alignment layer.

The second alignment layer may be formed of reactive mesogen (RM).

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention. In the drawings.

DETAILED DESCRIPTION OF PREFERRED EMBODIMENTS

Reference will now be made in detailed embodiments of the invention examples of which are illustrated in the accompanying drawings.

Figure 1:
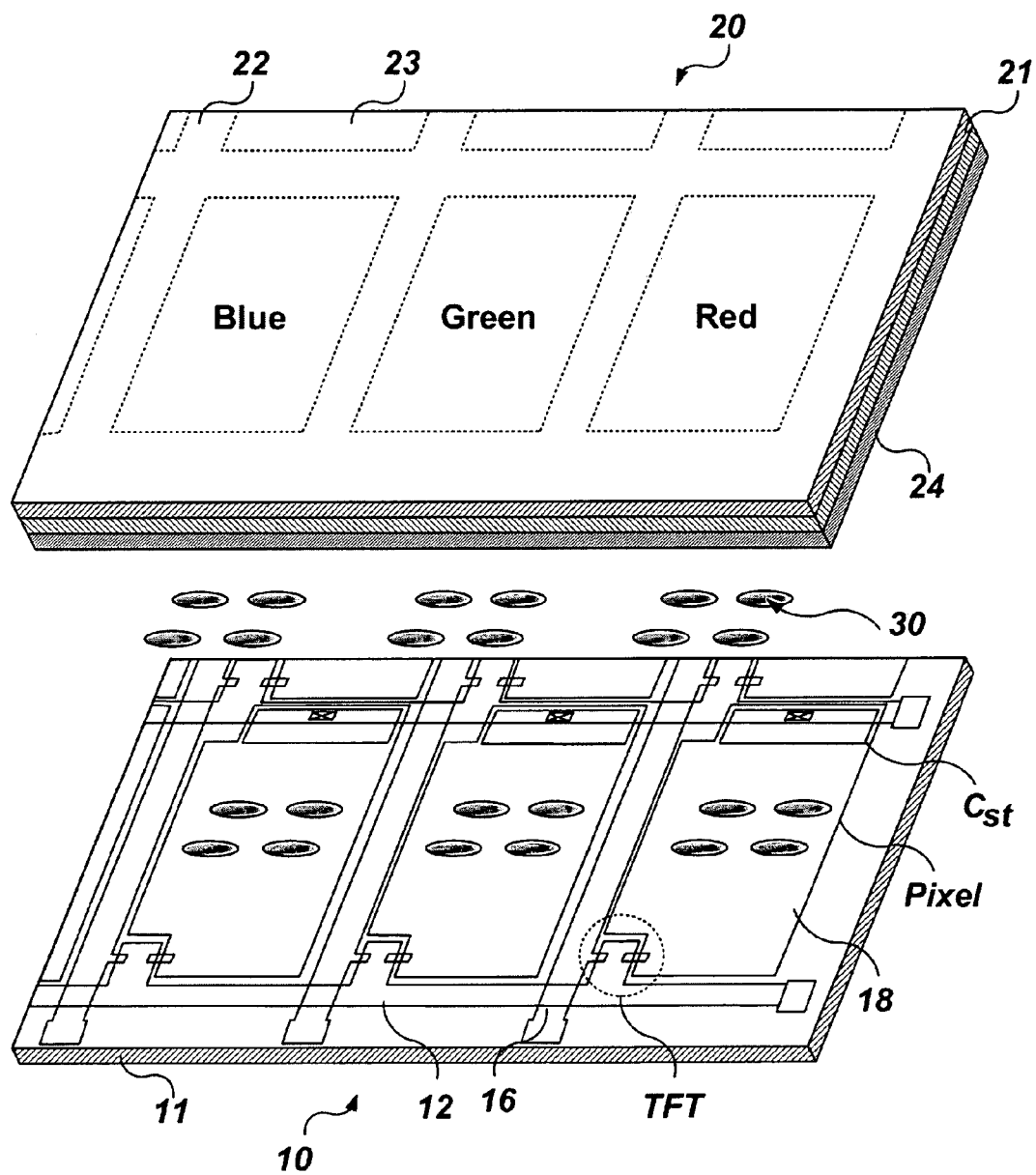
FIG. 1 is a perspective view of a liquid crystal display according to an embodiment.

FIG. 1 is a perspective view of a liquid crystal display according to an embodiment.

Referring to FIG. 1, a liquid crystal panel positioned inside the liquid crystal display may includes a first substrate 10 and a second substrate 20 coupled to each other with a predetermined gap therebetween, and a liquid crystal layer 30 may be injected between the first substrate 10 and the second substrate 20. The first substrate 10 is defined by a TFT area TFT being a switching area, a pixel area (Pixel), and a storage area CST.

The first substrate 10 may include a transparent glass substrate 11, and a plurality of gate lines 12 and a plurality of data lines 16 positioned on the transparent glass substrate 11. The plurality of gate lines 12 may be arranged in one direction with a predetermined distance therebetween. The plurality of data lines 16 may be arranged with a predetermined distance therebetween in a direction substantially perpendicular to the gate lines 12. The pixel area (Pixel) is defined by the gate lines 12 and the data lines 16.

A pixel electrode 18 may be formed in each pixel area (Pixel), and a thin film transistor may be formed at each of crossing portion of the gate lines 12 and the data lines 16. The thin film transistor may apply a data signal of the data line 16 to the pixel electrode 18 in response to a scan signal applied through the gate line 12.

The second substrate 20 may include a transparent glass substrate 21, and a black matrix layer 22. The black matrix layer 22 may be formed on the transparent glass substrate 21 to block light transmitted through the remaining portion except the pixel area (Pixel) of the first substrate 10. Red (R), green (G) and blue (B) color filter layers 23 may be formed to express color corresponding to each pixel area (Pixel). A common electrode 24 may be formed on each of the color filter layers 23.

A charge capacitor may be formed on an upper portion of the gate line 12 to be connected substantially in parallel to the pixel electrode 18. A first electrode of the charge capacitor may use a portion of the gate line 12, and a second electrode may use a metal pattern of an island shape made of the same material as a source electrode and a drain electrode.

The liquid crystal layer 30 of the liquid crystal display may be aligned by electric field between the pixel electrode 18 and the common electrode 24. The quantity of light transmitted through the liquid crystal layer 30 may be controlled depending on an alignment direction of the liquid crystal layer 30, thereby displaying a desired image.

The above-described liquid crystal display is a twisted nematic (TN) mode liquid crystal display. Liquid crystal molecules forming liquid crystal cells in the TN mode liquid crystal display may have a thin and long stick shape, and may be spirally twisted with a predetermined pitch therebetween. Therefore, the liquid crystal display may have a twisted structure in which longer axis alignment directions of the liquid crystal molecules vary continually.

Figure 2:
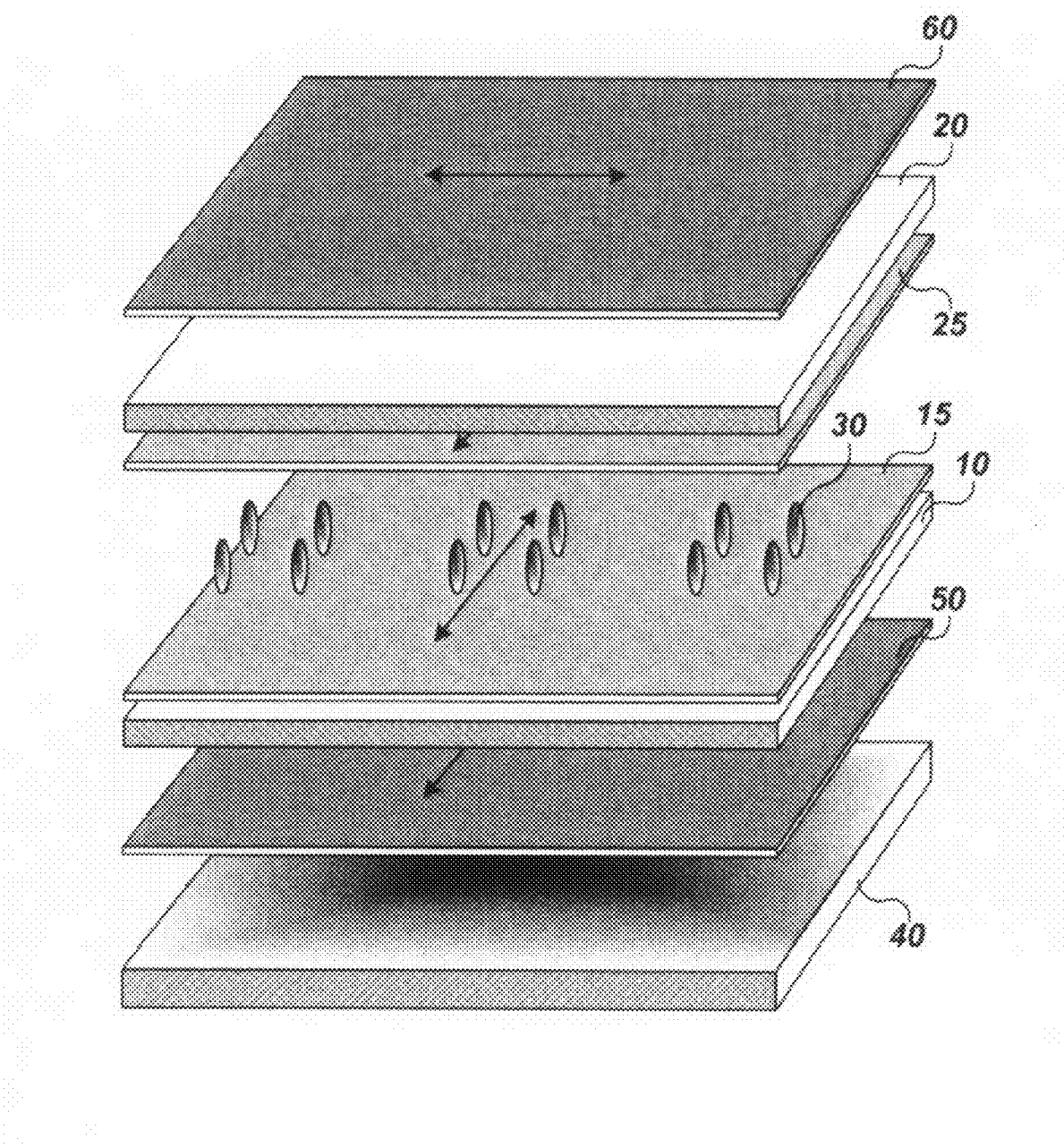
FIG. 2 schematically illustrates a configuration of a liquid crystal panel according to an embodiment.

FIG. 2 schematically illustrates a configuration of a liquid crystal panel according to an embodiment.

Referring to FIG. 2, the liquid crystal panel according to an embodiment may include the first substrate 10, the second substrate 20, the liquid crystal layer 30, a first polarizer 50, a second polarizer 60, and a backlight unit 40. A first alignment layer 15 and a second alignment layer 25 may be formed on the first substrate 10 and the second substrate 20 using a rubbing method, respectively.

Figure 3:
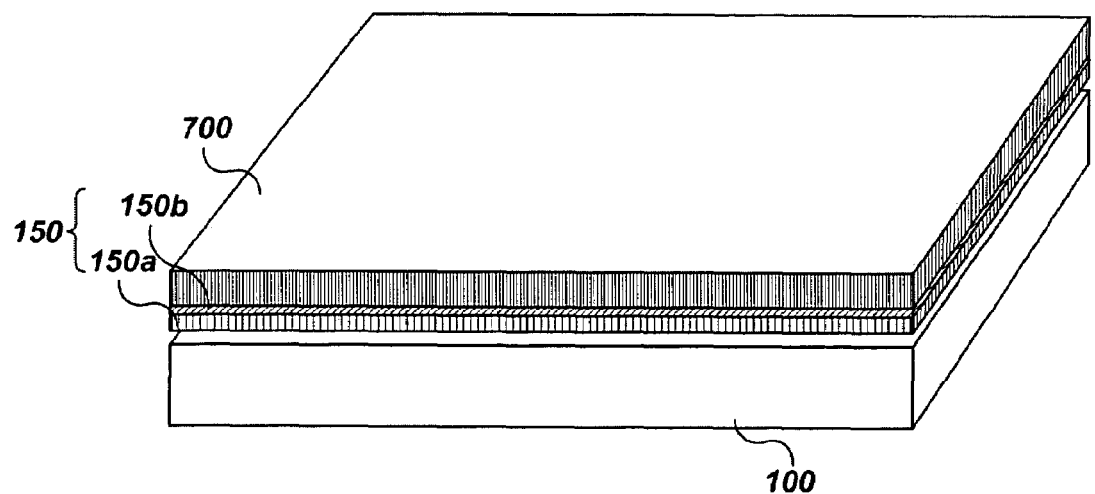
FIG. 3 illustrates an anisotropic distribution of a sample for measuring an alignment axis for a liquid crystal display according to an embodiment.

The liquid crystal panel of FIG. 3 is a liquid crystal cell with anti-parallel alignment. Examples of the anti-parallel alignment include an in-plane switching (IPS) mode liquid crystal cell and an electrically controllable birefringence (ECB) mode liquid crystal cell. The first polarizer 50 and the second polarizer 60 may be disposed in a cross-Nicol configuration.

FIG. 2 has illustrated that all of mediums are spaced apart from one another. However, in fact, all the mediums may contact one another. Electrical and optical characteristics of the liquid crystal display may be determined by alignment directions of the first and second alignment layers 15 and 25 and polarized directions of the first and second polarizers 50 and 60. In other words, since the electrical and optical characteristics of the liquid crystal display may be determined by the combination of the alignment directions of the first and second alignment layers 15 and 25 and the polarized directions of the first and second polarizers 50 and 60, the alignment directions and the polarized directions (i.e., alignment axes and polarization axes) need to be accurately known.

A sample for measuring an alignment axis for the liquid crystal display according to an embodiment may be obtained by coating a material with large anisotropy (i.e., a material capable of improving anisotropy) on the substrate on which the first alignment layer is formed using a rubbing process. The measuring sample accurately measures the alignment axis (i.e., an alignment direction) of the alignment layer.

More specifically, the second alignment layer may be formed by coating a material (for example, reactive mesogen (RM)) with an orientation order on the first alignment layer on which the rubbing process is performed, thereby increasing an anisotropic area of the measuring sample.

The reactive mesogen may have a high birefringence more than about 0.16 may be cured by ultraviolet (UV) rays to form a polymer. Therefore, an alignment direction of the reactive mesogen may be fixed and used as an optical compensation plate.

When the reactive mesogen (RM)) is coated on the first alignment layer, the anisotropic area of the measuring sample increases. When the alignment direction of the alignment layer is measured using the measuring sample, the intensity of transmissive light varies depending on the azimuth direction. Therefore, the alignment direction of the alignment layer may be easily measured by detecting the minimum intensity of transmissive light.

FIG. 3 illustrates an anisotropic distribution of a sample for measuring an alignment axis for a liquid crystal display according to an embodiment.

Referring to FIG. 3, in the sample for measuring the alignment axis for the liquid crystal display according to an embodiment, a glass substrate 100 may include an isotropic area about 0.7 mm thick, and a first alignment layer 150 may be formed on the glass substrate 100 using a rubbing method. The first alignment layer 150 includes an isotropic area 150a about 500 Å thick and an anisotropic area 150b about 50 Å thick. A second alignment layer 700 may be formed on the first alignment layer 150, and may have an anisotropic area of about several thousands Å thick. Hence, the thickness of the anisotropic area of the second alignment layer 700 may be more than the anisotropic area 150b of the first alignment layer 150.

FIGS. 4a to 4d are flow charts of a method of manufacturing a measuring sample of an alignment axis for a liquid crystal display according to an embodiment.

Figure 4A:
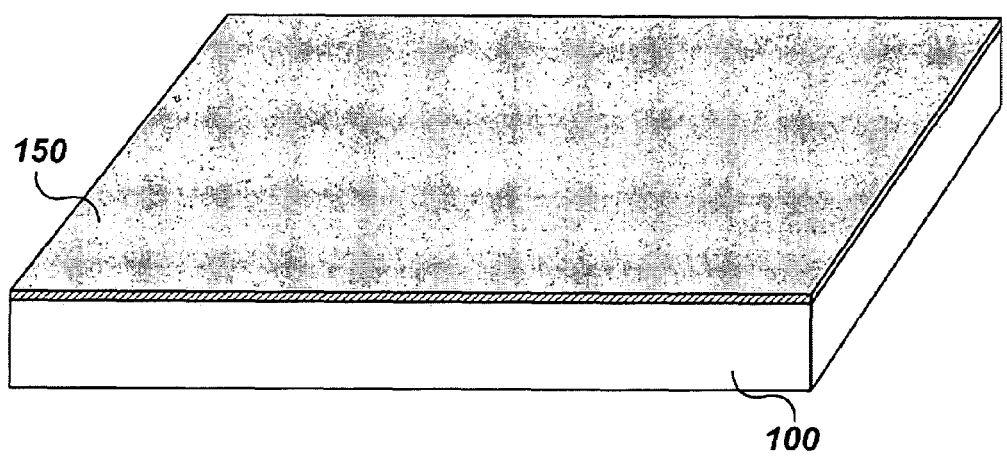
FIGS. 4a to 4d are flow charts of a method of manufacturing a measuring sample of an alignment axis for a liquid crystal display according to an embodiment.

Referring to FIG. 4a, polyimide forming the first alignment layer 150 may be printed on the first substrate 100 for the liquid crystal display. The first alignment layer 150 may be formed on the first substrate 100 using an optical alignment method, an ion beam alignment method, an inorganic-film oblique evaporation method, a micro-rubbing method, a self-absorption alignment method, and the like.

Figure 4B:
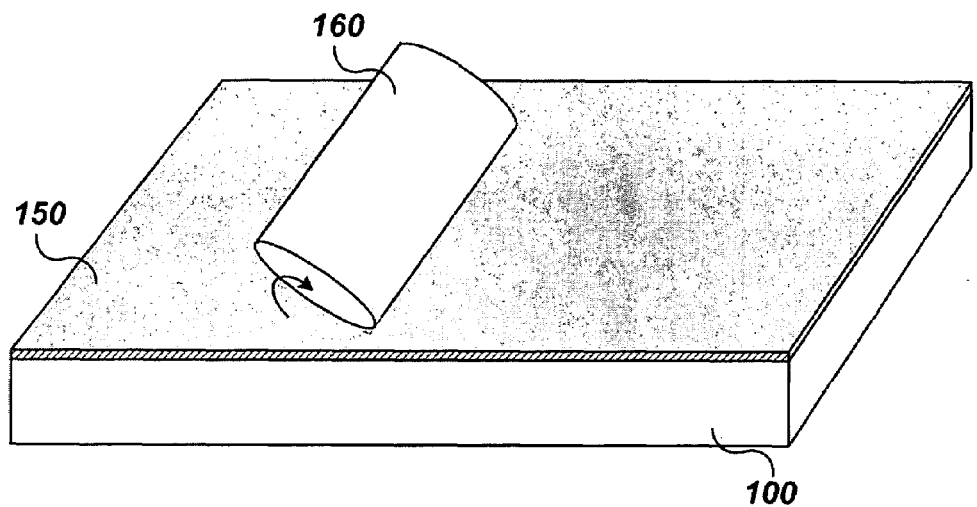

Referring to FIG. 4b, a rubbing process may be performed using a roller 160 to form the first alignment layer 150 on the first substrate 100.

Figure 4C:
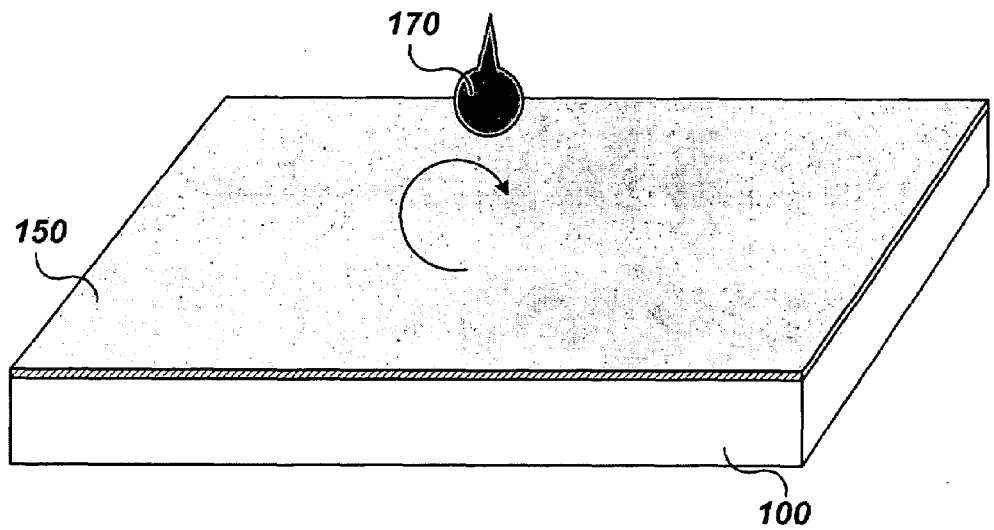

Referring to FIG. 4c, a material (for example, reactive mesogen) with anisotropy more than the anisotropy of the first alignment layer 150 may be coated on the first alignment layer 150 using a spin coating method. A reactive mesogen sample may be coated using various methods such as a spin coating method, a roll coating method, a slit coating method, and an inkjet coating method.

Figure 4D:
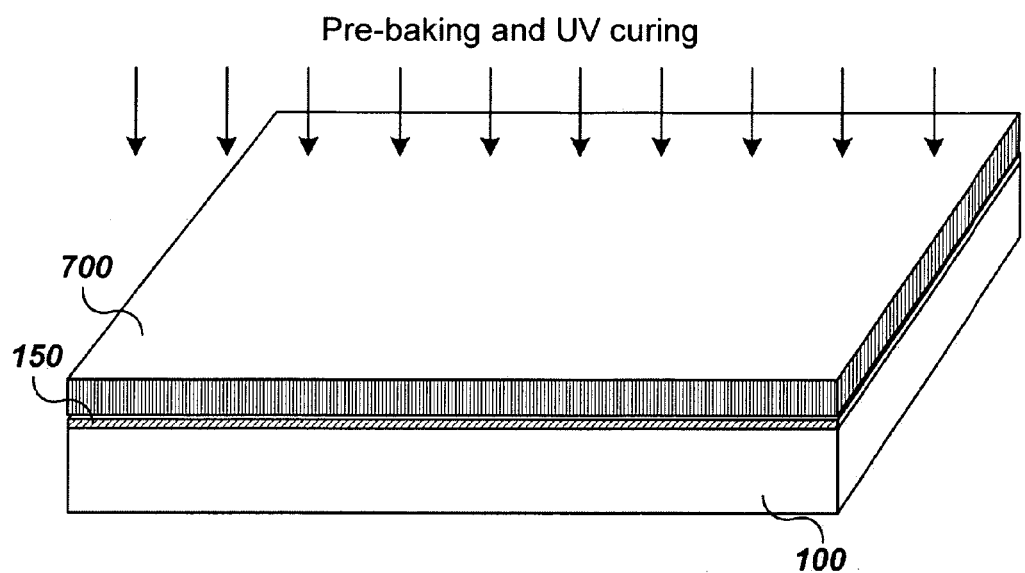

Referring to FIG. 4d, after a pre-bake process is performed on the coated reactive mesogen, the pre-baked reactive mesogen may be cured by UV rays to form the second alignment layer 700 on the first alignment layer 150.

The second alignment layer 700 may be formed of a material having the anisotropy more than the anisotropy of the first alignment layer 150 through a thermosetting process or a photo-curing process. The first and second alignment layers 150 and 700 may have the same alignment direction.

Figure 5:
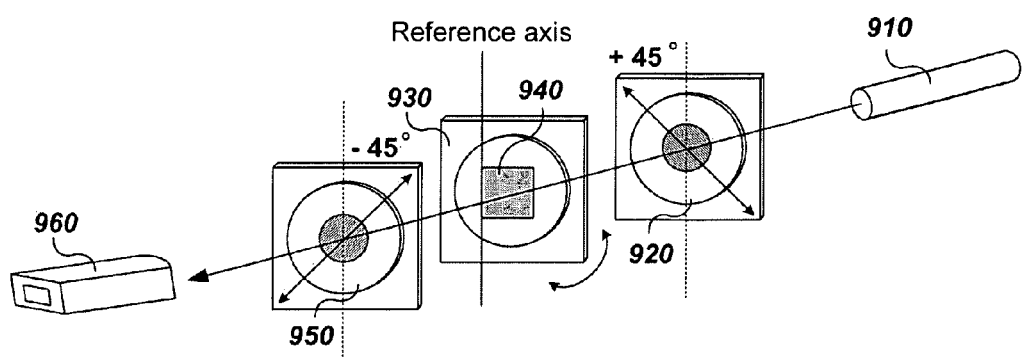
FIG. 5 illustrates a principle of a measuring apparatus of an alignment axis according to an embodiment.

FIG. 5 illustrates a principle of a measuring apparatus of an alignment axis according to an embodiment.

Referring to FIG. 5, the measuring apparatus according to an embodiment may includes a light source 910, a first polarizer 920, a measuring sample holder 930, a measuring sample 940, a second polarizer 950, and a detector 960.

The light source 910 may use a laser light source, and may generate light of about 1 mm-diameter and about 405 nm-wavelength. The detector 960 may be a photodetector or a luminance meter.

The first polarizer 920 and the second polarizer 950 may have a cross-Nicol configuration. The measuring sample 940 may be put into the measuring sample holder 930 between the first polarizer 920 and the second polarizer 950. While the measuring sample holder 930 rotates in the azimuth direction, a change in the intensity of transmissive light may be measured and interpreted.

In other words, an angle, at which the minimum intensity of transmissive light is detected based on a measuring result of the intensity of transmissive light according to the azimuth direction, may be determined as an alignment direction. In this case, the first polarizer 920 and the second polarizer 950 may rotate within the range of 0°-360°. The first polarizer 920 and the second polarizer 950 may rotate while maintaining the cross-Nicol configuration each other.

If the intensity of transmissive light is measured using a first alignment layer on which only the rubbing process is performed, a thickness of an anisotropic area of a measuring sample including the first alignment layer is much less than a thickness of an isotropic area of the measuring sample 940. Therefore, there are small changes in the intensity of transmissive light in the azimuth direction. However, in a case of using the measuring sample 940 according to an embodiment, there are large changes in the intensity of transmissive light in the azimuth direction.

A method for measuring the alignment axis using the measuring apparatus of FIG. 5 is as follows.

First, a liquid crystal panel may be prepared as the measuring sample 940. The liquid crystal panel may include the first alignment layer formed on the first substrate and/or the second substrate and the second alignment layer that is formed on the first alignment layer and has anisotropy more than anisotropy of the first alignment layer.

Next, the measuring sample 940 put into the measuring sample holder 930 along the reference axis. The first and second polarizers 920 and 950 may be disposed in front and in rear of the measuring sample 940 in a cross-Nicol configuration.

The detector 960 measures the intensity of light that may be generated in the light source 910 and passes through the first polarizer 920, the measuring sample 940, and the second polarizer 950.

The measuring sample holder 930 into which the measuring sample 940 is put may rotate in the azimuth direction, and then the detector 960 may measure the intensity of transmissive light depending on rotation angles in the azimuth direction.

Accordingly, the alignment direction of the measuring sample 940 may be determined by detecting the minimum intensity of transmissive light. In the measuring sample 940, the thickness of the anisotropic layer of the alignment layer is more than the thickness of the isotropic layer thereof. Therefore, the alignment direction of the measuring sample 940 may be determined as a direction parallel to the first polarizer 920 with the intensity of transmissive light being minimized.

Figure 6:
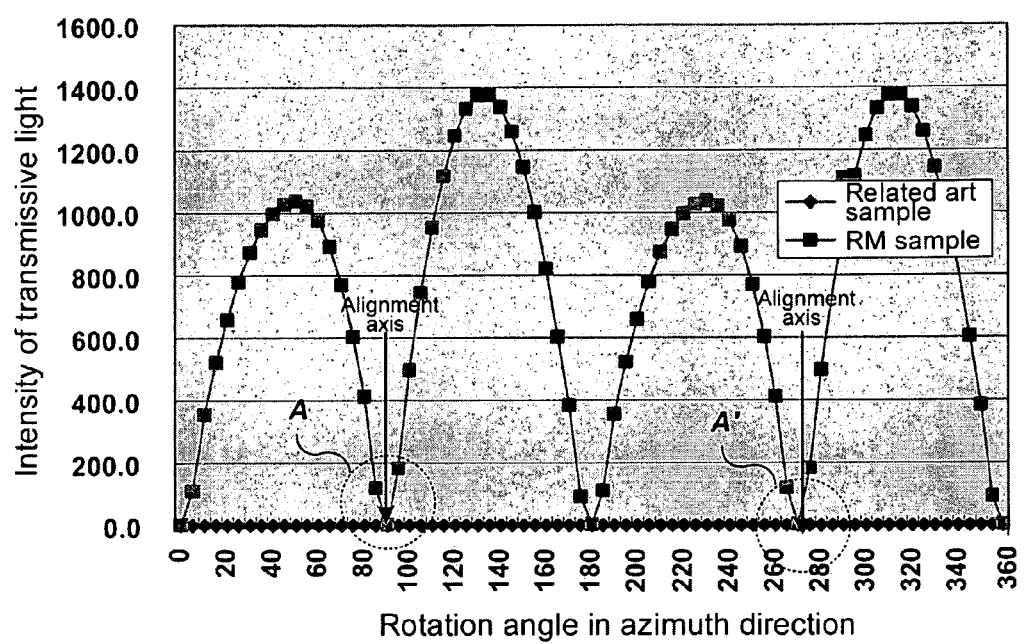
FIG. 6 is a graph of changes in the intensity or transmittance of transmissive light depending on rotation angles in the azimuth direction with respect to a sample for measuring an alignment axis for a liquid crystal display according to an embodiment.

FIG. 6 is a graph of changes in the intensity or transmittance of transmissive light depending on rotation angles in the azimuth direction with respect to a sample for measuring an alignment axis for a liquid crystal display according to an embodiment. FIG. 6 is a graph comparing the measuring sample according to an embodiment with the related art measuring sample on which only the rubbing process is performed with respect to changes in the intensity of transmissive light depending on rotation angles in the azimuth direction.

Referring to FIG. 6, in the related art measuring sample on which only the rubbing process is performed, it is difficult to measure an angle at which the minimum intensity of transmissive light is detected because there are small changes in the intensity of transmissive light depending on rotation angles in the azimuth direction. However, in the measuring sample according to an embodiment, it is easy to measure an angle at which the minimum intensity of transmissive light is detected because there are great changes in the intensity of transmissive light depending on rotation angles in the azimuth direction.

In other words, in the related art measuring sample on which only the rubbing process is performed, because there are small changes in the intensity of transmissive light depending on the rotation angles in the azimuth direction, it is difficult to measure an angle at which the minimum intensity of transmissive light is detected. However, in the reactive mesogen (RM) measuring sample according to an embodiment, it is easy to measure an angle at which the minimum intensity of transmissive light is detected because there are great changes in the intensity of transmissive light depending on the rotation angles in the azimuth direction.

In FIG. 6, reference symbols A and A' indicate rotation angles obtained when the intensity of transmissive light is minimized and the alignment direction of the measuring sample is parallel to the first polarizer. In the measuring sample according to an embodiment, the intensity of transmissive light is minimized at 90° and 270°, and thus 90° and 270° may be the alignment direction of the measuring sample.

As described above, according to an embodiment, since the measuring sample is obtained by forming the reactive mesogen (RM) with large anisotropy on the alignment layer formed through the rubbing method, the alignment direction of the alignment layer of the liquid crystal display can be accurately measured.

Furthermore, since the alignment direction of the alignment layer is accurately measured, optical characteristics of the liquid crystal display can be accurately determined, thereby improving characteristics of the liquid crystal display The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

It will be apparent to those skilled in the art that various modifications and variation can be made in the present invention without departing from the spirit or the scope of the invention. Thus, it is intended that the present invention cover the modification and variations of this invention provided they come within the scope of the appended claims and their equivalents.

What is claimed is:

1. A sample for measuring an alignment axis for a liquid crystal display comprising:
   a first substrate;
   a first alignment layer positioned on the first substrate; and
   a second alignment layer that is positioned on the first alignment layer and has an anisotropy greater than an anisotropy of the first alignment layer,
   wherein a thickness of an isotropic layer of the first alignment layer is greater than a thickness of an anisotropic layer of the first alignment layer.

2. The sample for measuring the alignment axis of claim 1, wherein the second alignment layer is formed of a material having an anisotropy greater than the anisotropy of the first alignment layer.

3. The sample for measuring the alignment axis of claim 1, wherein an alignment direction of the second alignment layer is substantially the same as an alignment direction of the first alignment layer.

4. The sample for measuring the alignment axis of claim 1, wherein the second alignment layer is formed of reactive mesogen (RM).

5. The sample for measuring the alignment axis of claim 1, wherein a thickness of the first alignment layer is less than a thickness of the second alignment layer.

6. The sample for measuring the alignment axis of claim 1, wherein an anisotropic area of the second alignment layer has a thickness of about several thousands Å.

7. The sample for measuring the alignment axis of claim 1, wherein the first substrate is a thin film transistor array substrate or a color filter substrate.

* * * * *